BECKWITH & GRAHAM.
Holdback.

No. 85,898.  
Patented Jan. 19, 1869.

Witnesses  
George M. Weaver  
John G. Crocker

Inventor  
Alvin C. Beckwith  
George H. Graham

United States Patent Office.

ALVIN C. BECKWITH AND GEORGE H. GRAHAM, OF ORISKANY, NEW YORK.

Letters Patent No. 85,898, dated January 19, 1869.

---

IMPROVEMENT IN HOLDBACKS.

---

The Schedule referred to in these Letters Patent and making part of the same.

---

*To all whom it may concern:*

Be it known that we, ALVIN C. BECKWITH and GEORGE H. GRAHAM, of Oriskany, county of Oneida, New York, have invented a new and improved Holdback; and we do hereby declare that the following is a full, clear, and exact description of our said invention, and of the mode of using the same, reference being had to the annexed drawing, making a part of this specification, in which—

Figure 1:
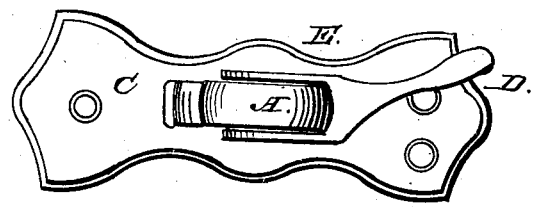
Figure 2:
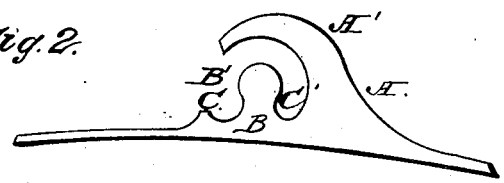
Figure 3:
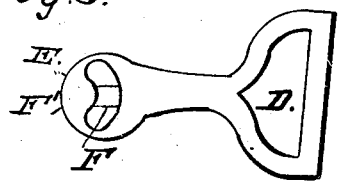
Figure 4:
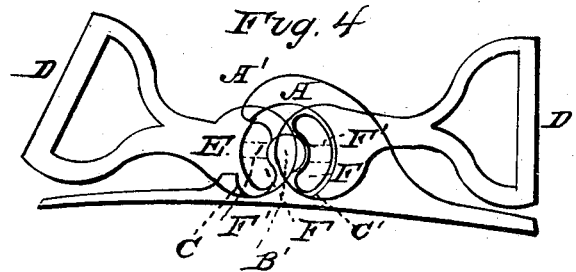

Figure 1 represents a plan of the holdback.
Figure 2, a longitudinal sectional view of the hook.
Figure 3, a like view of the loop.
Figure 4 represents the loop when about to be attached, and also when hooked on.

The hook A has its inner edge A' in the form of a segment of a circle, and there rises from under its point an arm, B, having its upper end, B', circular, with its axis at right angles to the hook A, and concentric with said inner curve A' of said hook.

In front of B is a semicircular depression, C, also at right angles to the hook, with a corresponding one, C', on the other side of B, as seen in fig. 2.

The loop has an eye, D, at one end for the strap, and at the other end, a loop, E, with a cross-bar, F, therein, by which to take hold of the hook.

The cross-bar F has a semicircular depression, F', across its front, of the same curve as B', as seen in fig. 3.

The mode of using our improved holdback is as follows:

The hook is attached to the thill of the vehicle in any proper way, and the breeching-strap is looped into the eye D, and when the horse is to be hitched on, the upper side of the cross-bar F is laid in C, the curve F' fitting against B', as represented by the red lines in fig. 4. If now the end, D, of the loop is turned up, the cross-bar F will roll around the circular head B', and the lower side of F will rest in C', as represented by the blue lines in fig. 4. When in this position, the holdback is completely locked, and will remain so as long as the traces remain hitched; but as soon as they are unhitched, the forward motion of the horse will cause the loop to turn back to the first position, and become detached, without the necessity of any one touching the holdback.

In order to prevent rattling, an India-rubber spring may be inserted in the cross-bar F, and for this purpose a slot may be left in the cross-bar F.

Having thus described our invention,
What we claim therein as new, and desire to secure by Letters Patent, is—

The hook A with the centre B', in combination with the cross-bar F, with the depression F', all constructed and operating substantially as described.

ALVIN C. BECKWITH.
GEORGE H. GRAHAM.

Witnesses:
GEORGE M. WEAVER,
JOHN G. CROCKER.